Aug. 11, 1925.
S. B. WINN
1,548,968
TRACTOR TRAILER COMBINATION
Filed Nov. 24, 1922    3 Sheets-Sheet 1
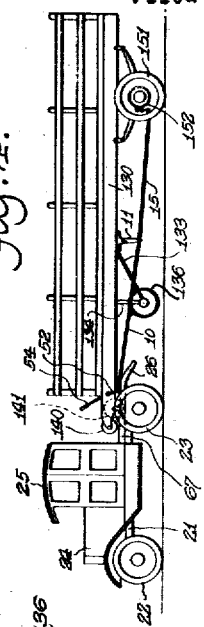
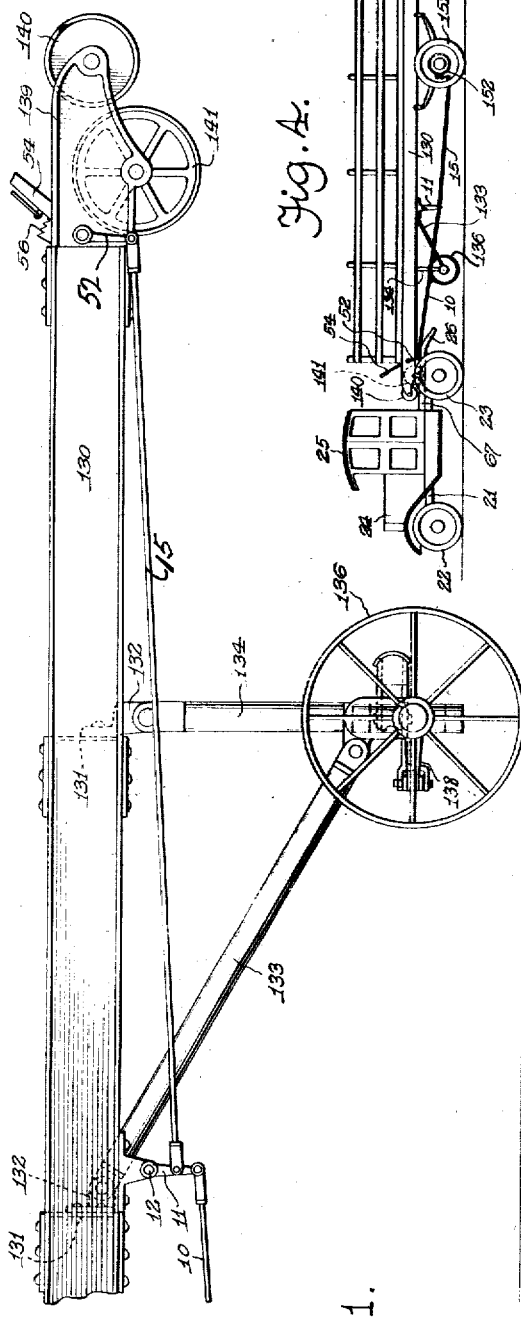
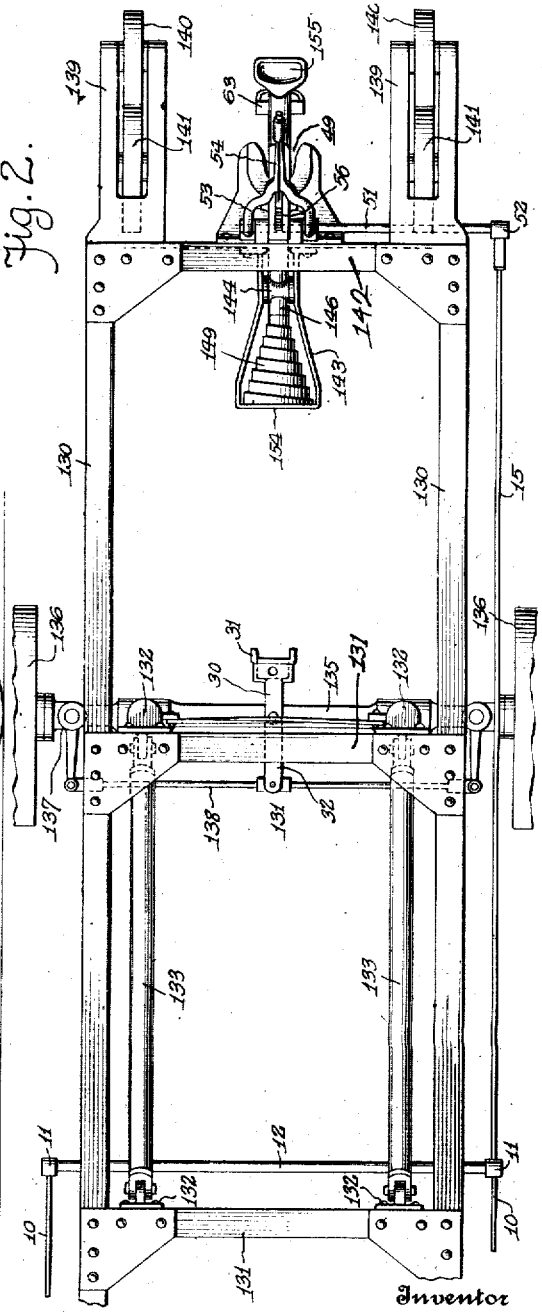
Inventor
Sidney B. Winn,
By
Attorneys

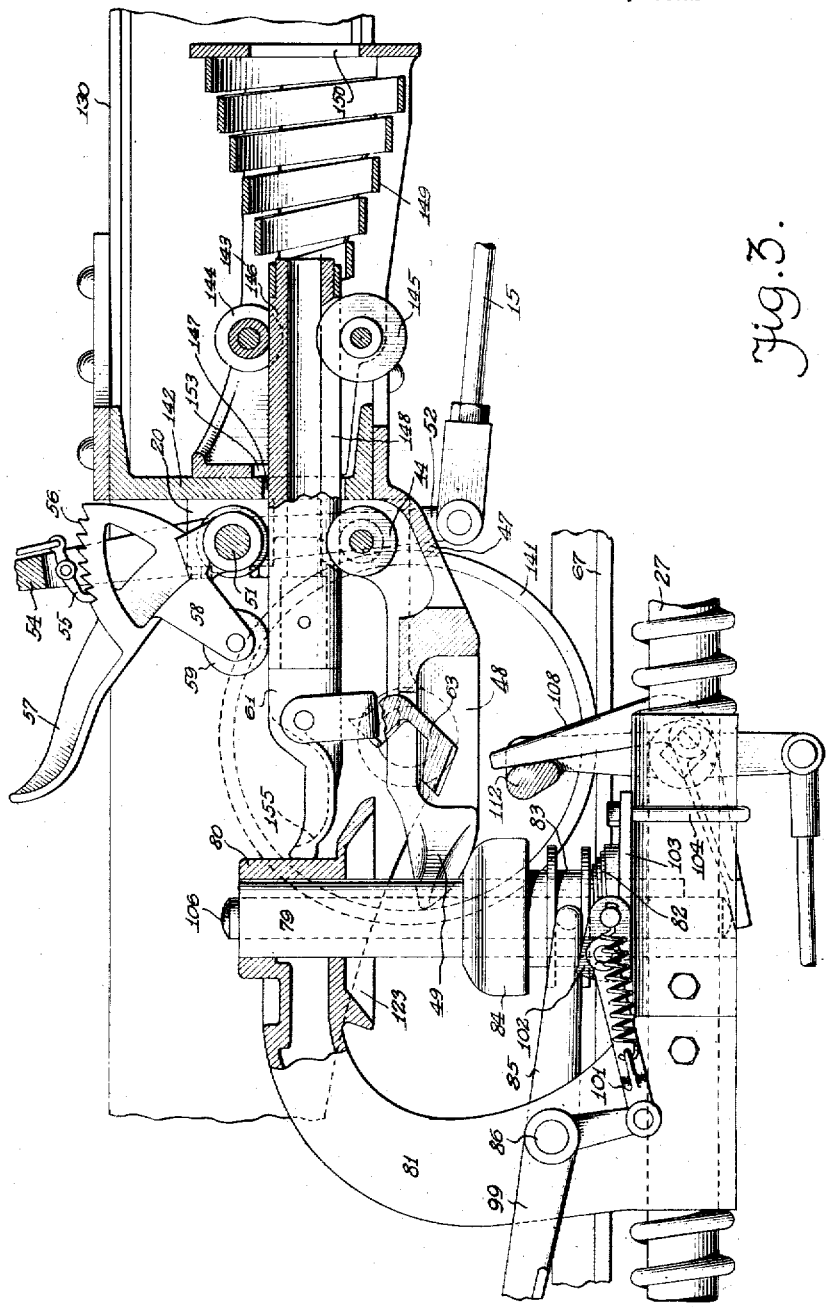

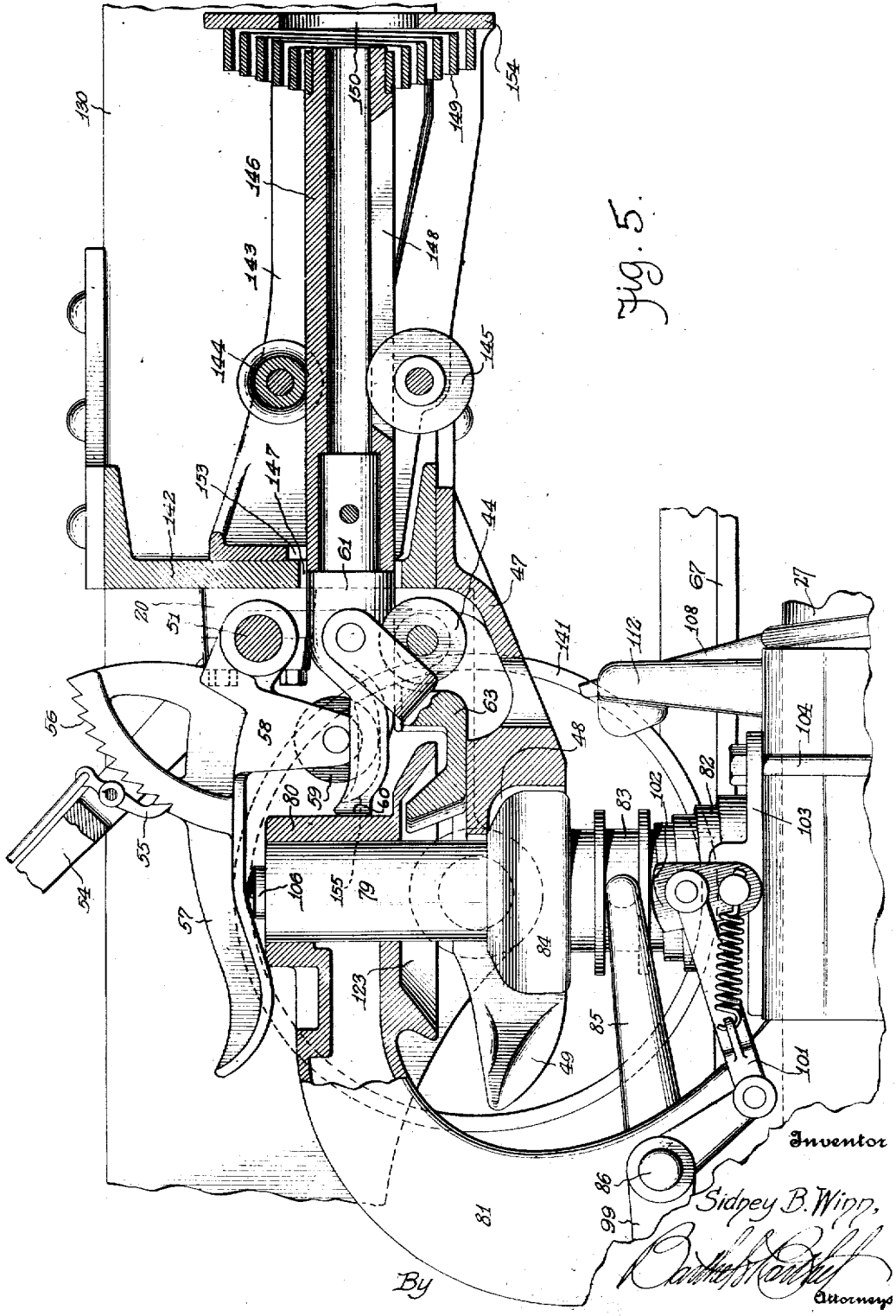

Patented Aug. 11, 1925.

1,548,968

UNITED STATES PATENT OFFICE.

SIDNEY B. WINN, OF LAPEER, MICHIGAN

TRACTOR TRAILER COMBINATION.

Application filed November 24, 1922. Serial No. 602,929.

*To all whom it may concern:*

Be it known that I, SIDNEY B. WINN, a citizen of the United States of America, residing at Lapeer, in the county of Lapeer and State of Michigan, have invented certain new and useful Improvements in Tractor Trailer Combinations, of which the following is a specification, reference being had therein to the accompanying drawings.

This invention relates to a tractor trailer combination, and has special reference to that class of vehicles including a trailer having front and rear trucks, a tractor adapted to have an end thereof placed under an end of the trailer to raise the adjacent trailer truck from the ground, and a coupling and uncoupling mechanism between the tractor and trailer so that said tractor and trailer may be coupled and uncoupled at will.

One of the objects of this invention is to provide a trailer with brakes and a brake operating mechanism which may be actuated automatically by withdrawal of a tractor from the trailer to apply and set the brakes of the trailer, or manually actuated, when the trailer is independent of the tractor, to release the trailer brakes.

Another object of this invention is to provide a trailer brake mechanism that may be manually controlled from a tractor attached to the trailer, and automatically controlled when the trailer attempts to override the tractor.

A further object of my invention is to provide a tractor trailer combination wherein the coupling mechanism between the tractor and trailer necessitates applying the brakes of the trailer before the tractor can be uncoupled from the trailer.

A further object of my invention is to provide a tractor trailer combination wherein withdrawal of the tractor from the trailer causes the trailer brakes to be applied and eventually set, and coupling of the tractor to the trailer releasing the trailer brakes and automatically placing said brakes under control from and by the tractor.

A further object of this invention is to provide a tractor trailer combination wherein the trailer has a brake mechanism including a shiftable locking bar or member adapted to be shifted by a tractor a brake setting distance as the tractor withdraws from the trailer.

A further object of this invention is to provide a tractor trailer combination wherein the trailer has a relatively fixed ground engaging truck adapted to be elevated from the ground by a tractor, and on the tractor is a pick-up track adapted to place the forward end of the trailer on the tractor. To facilitate such transfer the forward end of the trailer has sets of elevating wheels, one set causing an initial elevation of the forward end of the trailer, the other set a further elevation, and the tractor track a final elevation. In this manner the tractor may effect a gradual transfer of the weight of the forward end of the trailer to the end of the tractor.

A still further object of this invention is to provide a tractor trailer combination wherein the trailer has a forward relatively fixed truck provided with a steering mechanism which permits of the trailer being moved by a tongue-coupled team, tractor or other power apparatus or independent of such power, for instance when shifting the trailer about when loading or unloading.

The above and other objects are attained by vehicular construction that will be hereinafter described and then claimed, and reference will now be had to the drawings, wherein—

Figure 1 is a side elevation of a portion of a trailer in accordance with my invention;

Fig. 2 is a plan of the same;

Fig. 3 is an enlarged longitudinal sectional view of the forward end of the trailer and the coupling and uncoupling mechanism between the tractor and trailer, the parts being shown in a position corresponding to an intermediate position in the coupling and uncoupling operations.

Fig. 4 is a diagrammatic view of the tractor trailer combination.

Fig. 5 is a view of the parts shown in Fig. 3 with the parts in coupled relation.

In the drawings, the reference numeral 130 denotes a trailer chassis or frame having its rear end supported by a truck 151 and the wheels of said truck are adapted to be engaged or held by brake shoes or bands 152 shiftable relative to said wheels.

Adjacent the forward end of the trailer chassis or frame 130 are transverse members 131 provided with sets of brackets 132 for the upper ends of vertical and angularly disposed fixed legs or supports 134 and 133, said legs or supports having the lower ends thereof connected to an axle 135 provided with knuckles 137 and wheels 136, said knuckles being connected for movement in synchronism by a rod 138. The elements 133 to 138 constitute a fixed truck having wheels that may be steered when moving the trailer independent of the tractor.

Pivotally supported from the axle 135 by a suitable bracket or support 30 is a coupling head or member 31 to which a tongue or other member may be connected for moving and steering the trailer. The coupling head 31 has a rearwardly extending arm 32 pivotally connected to the rod 138, and swinging of the coupling head 31, like a tiller, causes the wheels 136 to be steered or guided.

At the forward end of the trailer chassis or frame is an end frame or transverse member 142 provided with an opening 147 and projecting forwardly from the transverse member 142 at the sides of the chassis or frame 130 are brackets or bearings 139 for front wheels 140 and rear wheels 141, the axis of the wheels 140 being in a plane farther from the ground than the axis of the wheels 141, and these wheels represent two sets of a plurality of sets of wheels that may be used in connection with the trailer to cause the end of the trailer to be elevated when the end of a tractor impinges against the wheels 140 and 141, for instance when backing the rear end of the tractor under the forward end of the trailer, as will hereinafter appear.

Suitably connected to the inner face of the transverse member 142 is a longitudinally disposed housing 143 devoid of top and bottom walls and having its end walls provided with openings 150 and 153 (see Fig. 3) the latter communicating with the opening 147 of the transverse member 142. Side walls of the housing 143 support guide rollers 144 and 145 and slidable between these guide rollers is a longitudinally disposed locking bar or member 146 provided with a longitudinal slot 148 into which the guide roller 145 extends to prevent rotation of the locking bar. At the inner end of the locking bar 146 is a helical expansion band spring 149 which has its inner convolution mounted on the inner end of the locking bar 146 and the outer convolution of said spring bears against the end wall 154 of the housing 143 and may be attached thereto.

At the outer end of the locking bar 146 is a head 61 having a comparatively wide forward end 60 serving as an abutment and the upper face of said head has a recess or depressed portion 155. Pivotally connected to the sides of the head 61 are the yoke ends 70 of a drag member 63 adapted to be supported in a raised position by the upper face of a socket coupling member 47 suitably attached to the transverse member 142. Either the socket coupling member 47 or the transverse member 142 may be provided with an anti-frictional roller 44 supporting the head 61 of the locking bar 146 relative to the socket coupling member 47. The outer end of the coupling member 47 has its lower face provided with a socket 48 and in said coupling member is a vertical slot 49 with its side walls flared outwardly to form a wide entrance into the coupling member, and the upper and lower faces of said coupling member are beveled or tapered so as not to provide any obstruction during a coupling operation of the tractor and trailer.

The transverse member 142 has bearings 20 for a rock shaft 51 and on the outer end of said rock shaft is a crank 52 to which a brake operating rod 15 is connected, said rod extending rearwardly to one of the cranks 11 of a transverse shaft or equalizer 12 supported in hangers from the chassis or frame 130 of the trailer. The cranks 11 are connected to rods 10 adapted for actuating the brake shoes or bands 152 of the rear truck of the trailer.

Fixed on the inner end of the rock shaft 51 is the forked end 53 of a brake lever 54 adapted to be manually shifted, although it may be otherwise shifted, as will hereinafter appear. The brake lever 54 has a conventional form of pivoted locking pawl or dog 55 adapted to be shifted by hand gripping the upper end of the brake lever, and the pawl or dog 55 normally engages a sector rack 56 loose on the rock shaft 51 in the fork 53 of the brake lever 54. The sector rack 56 has a forwardly extending shoe 57 and a depending bearing 58 for an anti-frictional roller 59 adapted to engage in the recess or depressed portion 155 of the head 61. When the roller 59 is not sealed in the depressed portion of the head 61, it is bearing on or riding against the upper side of the locking bar 146 (see Fig. 5) and, by virtue of the sector rack 56, pawl 55, lever 54, rock shaft 51 and connections to the rear truck of the trailer, maintains the trailer brakes applied or set.

The tractor includes a chassis or frame 21, front axle assembly 22, a rear axle assembly 23, a power plant 24, a cab or body 25, a platform or turn table 67, an inclined track or rails 26 leading to the platform 67, and a draft appliance 27, some of these devices being shown in detail in my application executed concurrently herewith and filed January 8, 1923, Ser. No. 611,319. On the draft appliance 27 are suitable supports for a tubular king bolt 79 through which extends a brake actuating pin 106, and embracing the upper end of the tubular king bolt 79 is the tubular upper end 80 of an overhanging arm 81 supported from the draft rigging. Surrounding the lower end of the tubular king bolt 79 is a conical expansion spring 82 and bearing on the upper convolution of this spring is the lower spool end 83 of a ball coupling member 84 which is slidable on the tubular king bolt 79 and adapted to be raised and lowered thereon, to either engage in the socket 48 of coupling member 47 of the trailer or release said member. A lever 85 operatable from the tractor by any suitable connections, such, for instance, as shown in said companion application Serial No. 611,319, is adapted to lower the ball socket member 84, except when a prop 102 is under the spool end 83 of the ball socket member. The prop 102 is pivoted on a plate 103 connected by U-bolts 104 to part of the draft rigging, and said prop is adapted to be actuated by a link 101 connected to a bell crank 99 supported on a pin 86 on which the lever 85 is fulcrumed, and the bell crank 99 is adapted to be actuated in advance of the lever 85.

In Figs. 3 and 5 I have illustrated the relative position of bell crank 108 and a yoke 112 forming part of the mechanism employed for actuating the pin 106 to apply the trailer brakes from the tractor, the movement of yoke 112 on its pivot rocking bell crank 108 in an obvious manner.

The upper end of the arm 81 is formed with a keeper 123 adapted to cooperate with the drag member 63, said drag member extending into keeper 123 when resting on the coupling member 47 said drag member will thus establish a temporary connection between the tractor and trailer, for brake setting purposes, as the tractor withdraws from the trailer.

Assuming that the tractor has been uncoupled from the trailer by lowering the ball coupling member 84 relative to the socket coupling member 47, the tractor can move away from the trailer with the set of wheels 141 moving on the platform 67 and on to the track 26. As the set of wheels 141 reach the end of the track the set of wheels 140 are brought into action by engaging the track before the set of wheels 141 leave the extremities of the track, consequently there is no sudden or jarring action of the trailer when transferring from one set of wheels to the other, and this is also true when the set of wheels 140 leave the track, for the reason that the wheels 136 of the trailer truck are by this time on the ground.

As the tractor moves away from the trailer the keeper 123 will pull the drag member 63 with it and since the sector rack 56 is supported from the trailer, this sector rack will be tilted by the roller 59 riding up on to the head 61 and eventually on to the locking bar 146. This shifting of the sector rack 56 will be just as though said rack was actuated by the pin 106 from the tractor. As the tractor continues to move away from the trailer the drag member 63 rides off of the forward end of the socket coupling member 47 and drops by gravity out of engagement with the keeper 123, thus completely severing connections between the tractor and trailer. The expansive force of the spring 149 holds the locking bar 146 in a forward position, where it remains until a tractor is again coupled to the trailer, but such position of the locking bar 146 does not interfere with release of the trailer brakes through the medium of the brake lever 54, when the trailer is to be moved about independent of the tractor.

When the rear end of the tractor is placed under the trailer the end 80 of the arm 81 impinges against the wide forward end of the head 61 and as the tractor moves under the trailer the locking bar 146 is pushed rearwardly and the drag member 63 raised into the keeper 123. As the rear end of the tractor is placed under the trailer the set of wheels 140 are first brought into action to engage the track 26 and as this set of wheels rides upwardly on the track, causing the initial elevation of the forward end of the trailer, the set of wheels 141 are brought into action to effect a further elevation of the forward end of the trailer, and a still further elevation is brought about by the track until the wheels 141 ride on to and are supported by the platform or turntable 67.

The sector rack 56 is eventually lowered to the position shown in Fig. 3, and an operative relation is established between the shoe 57 and the pin 106, so that the trailer brakes may be actuated independent of the locking bar 146.

As heretofore pointed out, certain of the features disclosed herein are also disclosed in the companion application, Serial No. 611,319, referred to above, the present application disclosing certain features of the broad general combination of the companion application as of alternative or modified form, although coming within the scope of claims common to both applications; sufficient disclosure of the broad common features is made herein to permit a clear understanding of the changes made in the general invention by the modification disclosed herein. Since the companion application contains the complete general disclosure within which the alternative specific features of the two applications are to be found, the claims common to the two disclosures are found in the companion application, to permit of a clearer understanding to be had of the inventions of the broader claims.

What I claim is:—

1. In tractor-trailer combinations, wherein a tractor and trailer are coupled together for combined service and disengageable by uncoupling for independent service, and wherein the coupling and uncoupling operations are rendered active by relative movement of tractor and trailer in the direction of traction, a brake mechanism for the trailer, said mechanism being operable at will when the tractor and trailer are coupled, and means carried by the trailer and normally inactive when the tractor and trailer are coupled and rendered active by the relative movement of tractor and trailer for setting said brake mechanism and normally maintaining the mechanism in its set condition during the period when the tractor and trailer are separated, said means including a spring-pressed locking-bar adapted to be restored to normal inactive position by the tractor backing into engagement with the trailer.

2. In a tractor trailer combination, a tractor, a trailer, a supporting instrumentality at the forward end of said trailer and adapted to be raised from the ground by the tractor backing under the forward end of the trailer, coupling means for said tractor and trailer, brakes for the trailer, and a brake mechanism independent of the supporting instrumentality of the trailer adapted to be actuated by uncoupling the tractor from the trailer to set the brakes of the trailer so that a tractor may back under the trailer without the trailer moving away from the tractor, said brake mechanism being releasable to permit of said trailer being moved independent of said tractor.

3. The combination of a tractor having a track, a trailer, a set of wheels carried by said trailer adapted to engage the tractor track and initially elevate the forward end of the trailer, another set of wheels carried by said trailer adapted to engage the tractor track and further elevate the forward end of the trailer, and coupling means for said tractor and trailer said latter set of wheels being active in the support of the forward end of the trailer when the tractor and trailer are coupled.

4. In a tractor trailer combination wherein a trailer is adapted to have its forward end ascend the rear end of a tractor to elevate the forward end of the trailer;—a track and front and rear sets of wheels to effect such elevation, the rear set of wheels causing a greater elevation of the forward end of the trailer than the front set of wheels, and the front set of wheels causing the initial elevation of the trailer.

5. In a tractor trailer combination, a plurality of wheels on the trailer adapted to be successively brought into operation as the tractor is backed under the trailer to gradually elevate and place the trailer on the tractor, certain of said wheels being active in the support of the forward end of the trailer when the tractor and trailer are coupled.

6. Means for elevating and lowering the forward end of a trailer relative to a tractor track, said means comprising wheels, one brought into action in advance of the other, said wheels causing a gradually elevating or lowering of the forward end of the trailer as the tractor track is moved relative to the trailer, certain of said wheels being active in the support of the forward end of the trailer when the tractor and trailer are coupled.

7. The combination of a tractor having a platform, and an inclined track, and a trailer having sets of wheels adapted to engage the tractor track and elevate an end of the trailer, the relation of the track and wheels being such that one set of wheels may cause initial elevation of the trailer end, the other set of wheels cause further elevation of the trailer end, and the tractor track cause final elevation of the trailer end to place the trailer end above the tractor platform.

In testimony whereof I affix my signature in presence of two witnesses.

SIDNEY B. WINN.

Witnesses:
ANNA M. DORR,
KARL H. BUTLER.

What I claim is:—

1. In tractor-trailer combinations, wherein a tractor and trailer are coupled together for combined service and disengageable by uncoupling for independent service, and wherein the coupling and uncoupling operations are rendered active by relative movement of tractor and trailer in the direction of traction, a brake mechanism for the trailer, said mechanism being operable at will when the tractor and trailer are coupled, and means carried by the trailer and normally inactive when the tractor and trailer are coupled and rendered active by the relative movement of tractor and trailer for setting said brake mechanism and normally maintaining the mechanism in its set condition during the period when the tractor and trailer are separated, said means including a spring-pressed locking-bar adapted to be restored to normal inactive position by the tractor backing into engagement with the trailer.

2. In a tractor trailer combination, a tractor, a trailer, a supporting instrumentality at the forward end of said trailer and adapted to be raised from the ground by the tractor backing under the forward end of the trailer, coupling means for said tractor and trailer, brakes for the trailer, and a brake mechanism independent of the supporting instrumentality of the trailer adapted to be actuated by uncoupling the tractor from the trailer to set the brakes of the trailer so that a tractor may back under the trailer without the trailer moving away from the tractor, said brake mechanism being releasable to permit of said trailer being moved independent of said tractor.

3. The combination of a tractor having a track, a trailer, a set of wheels carried by said trailer adapted to engage the tractor track and initially elevate the forward end of the trailer, another set of wheels carried by said trailer adapted to engage the tractor track and further elevate the forward end of the trailer, and coupling means for said tractor and trailer said latter set of wheels being active in the support of the forward end of the trailer when the tractor and trailer are coupled.

4. In a tractor trailer combination wherein a trailer is adapted to have its forward end ascend the rear end of a tractor to elevate the forward end of the trailer;—a track and front and rear sets of wheels to effect such elevation, the rear set of wheels causing a greater elevation of the forward end of the trailer than the front set of wheels, and the front set of wheels causing the initial elevation of the trailer.

5. In a tractor trailer combination, a plurality of wheels on the trailer adapted to be successively brought into operation as the tractor is backed under the trailer to gradually elevate and place the trailer on the tractor, certain of said wheels being active in the support of the forward end of the trailer when the tractor and trailer are coupled.

6. Means for elevating and lowering the forward end of a trailer relative to a tractor track, said means comprising wheels, one brought into action in advance of the other, said wheels causing a gradually elevating or lowering of the forward end of the trailer as the tractor track is moved relative to the trailer, certain of said wheels being active in the support of the forward end of the trailer when the tractor and trailer are coupled.

7. The combination of a tractor having a platform, and an inclined track, and a trailer having sets of wheels adapted to engage the tractor track and elevate an end of the trailer, the relation of the track and wheels being such that one set of wheels may cause initial elevation of the trailer end, the other set of wheels cause further elevation of the trailer end, and the tractor track cause final elevation of the trailer end to place the trailer end above the tractor platform.

In testimony whereof I affix my signature in presence of two witnesses.

SIDNEY B. WINN.

Witnesses:
 ANNA M. DORR,
 KARL H. BUTLER.

---

Certificate of Correction.

It is hereby certified that in Letters Patent No. 1,548,968, granted August 11, 1925, upon the application of Sidney B. Winn, of Lapeer, Michigan, for an improvement in "Tractor Trailer Combinations," an error appears in the printed specification requiring correction as follows: Page 2, line 115, for the word "sealed" read *seated;* and that the said Letters Patent should be read with this correction therein that the same may conform to the record of the case in the Patent Office.

Signed and sealed this 27th day of October, A. D. 1925.

[SEAL.]

KARL FENNING,
*Acting Commissioner of Patents.*

Certificate of Correction.

It is hereby certified that in Letters Patent No. 1,548,968, granted August 11, 1925, upon the application of Sidney B. Winn, of Lapeer, Michigan, for an improvement in "Tractor Trailer Combinations," an error appears in the printed specification requiring correction as follows: Page 2, line 115, for the word "sealed" read *seated;* and that the said Letters Patent should be read with this correction therein that the same may conform to the record of the case in the Patent Office.

Signed and sealed this 27th day of October, A. D. 1925.

[SEAL.]
KARL FENNING,
*Acting Commissioner of Patents.*